United States Patent [19]

Prenger

[11] Patent Number: 4,548,234
[45] Date of Patent: Oct. 22, 1985

[54] DISCHARGE VALVE ASSEMBLY

[75] Inventor: Werner H. Prenger, Coldwater, Ohio

[73] Assignee: Copeland Corporation, Sidney, Ohio

[21] Appl. No.: 580,779

[22] Filed: Feb. 21, 1984

Related U.S. Application Data

[63] Continuation of Ser. No. 318,053, Nov. 4, 1981, abandoned, which is a continuation-in-part of Ser. No. 234,343, Feb. 13, 1981, abandoned.

[51] Int. Cl.$^4$ .............................................. F16K 15/02
[52] U.S. Cl. .................................. 137/543.19; 137/540
[58] Field of Search ............... 137/512, 535, 536, 540, 137/543.13, 543.17, 543.19, 543.21

[56] References Cited

U.S. PATENT DOCUMENTS

| 1,367,452 | 2/1921 | Bolton | 137/543.19 |
|---|---|---|---|
| 1,834,589 | 12/1931 | Holdsworth | 137/543.19 |
| 1,998,444 | 4/1935 | Clapp | 137/543.19 |
| 2,062,816 | 12/1936 | Mercer | 137/512 |
| 3,378,030 | 4/1968 | Cary | 137/543.19 |
| 4,329,125 | 5/1982 | Chambers | 137/543.17 |

Primary Examiner—Alan Cohan
Assistant Examiner—John A. Rivell
Attorney, Agent, or Firm—Harness, Dickey & Pierce

[57] ABSTRACT

An improved discharge valve assembly for use with compressors and particularly the type utilizing a disc-like pressure responsive discharge valve is disclosed which includes a bridge element secured to a plate overlying the valve plate and one or more leaf spring biasing elements of the curved disc type positioned between the bridge element and disc valve member and being operative to urge the valve into a closed position. The bridge element is also provided with guide fingers to retain both the leaf spring elements and valve member in operative position.

4 Claims, 7 Drawing Figures

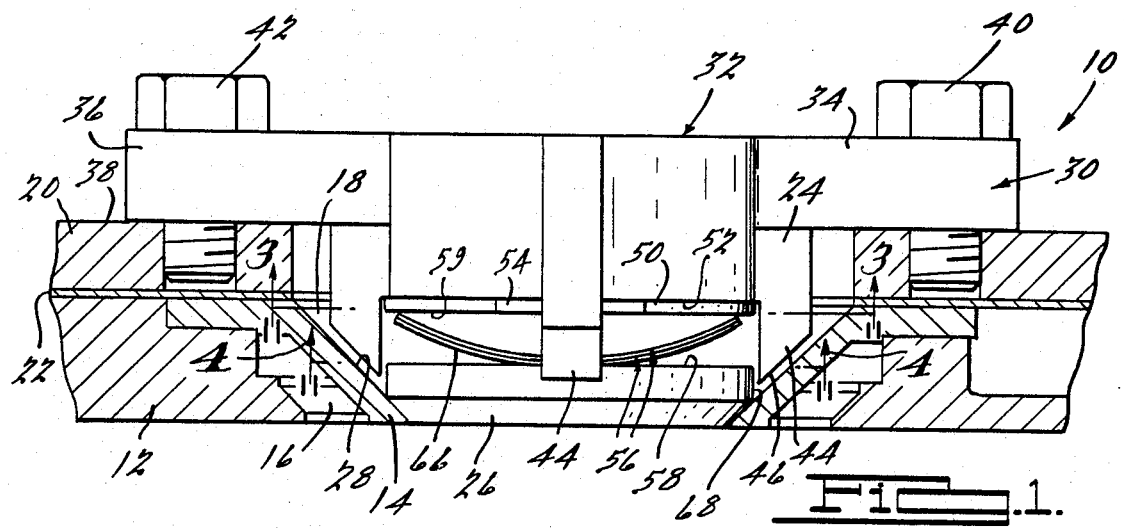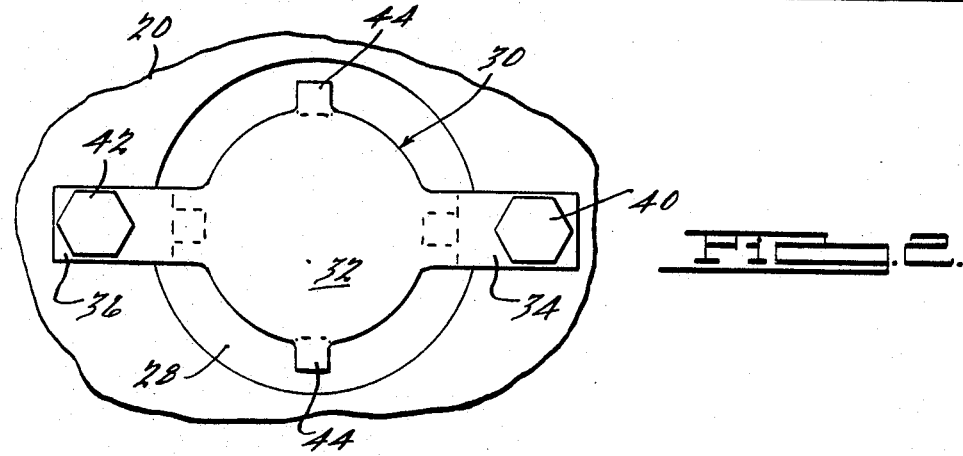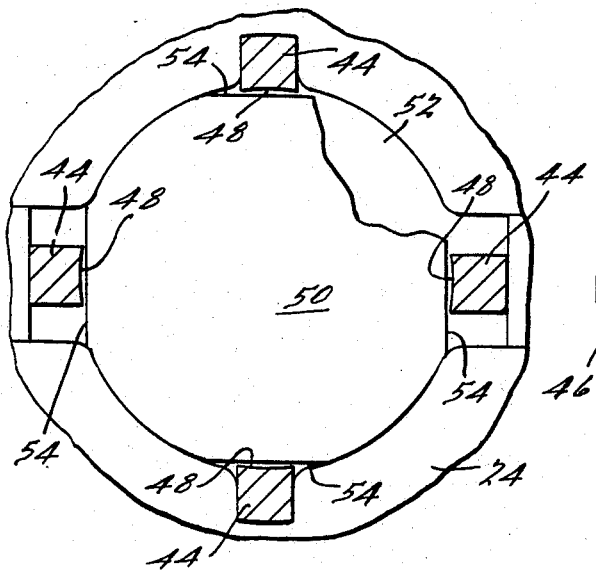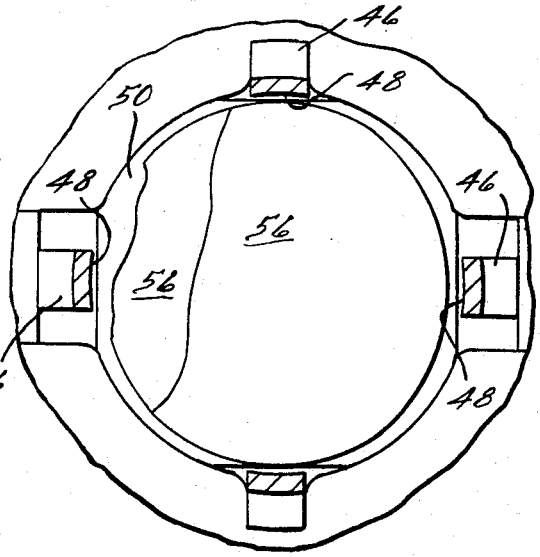

DISCHARGE VALVE ASSEMBLY

This application is a continuation of application Ser. No. 318,053, filed Nov. 4, 1981 now abandoned, which is a continuation-in-part of application Ser. No. 234,343, filed Feb. 13, 1981 abandoned.

BACKGROUND AND SUMMARY OF THE INVENTION

The present invention relates generally to pressure responsive compressor valve assemblies and more particularly to such assemblies employing disc type valve members and particularly adapted for use on refrigeration compressors.

The present invention is particularly well suited for use in combination with the disc like lightweight valves of the type disclosed in assignee's application Ser. No. 971,309, filed Dec. 20, 1978 now abandoned in favor of continuation application Ser. No. 219,849, filed Dec. 23, 1980, now Pat. No. 4,368,755 and the head and valve plate of assignee's copending application Ser. No. 114,346, filed Jan. 22, 1980 and represents an alternative to the coil spring biasing arrangements of assignee's copending application Ser. No. 114,345, filed Jan. 22, 1980. It may be used in both rotary and other types of compressors including single and multi-cylinder reciprocating piston type compressors of either hermetic or accessible hermetic type.

Valve plates and cylinder head assemblies can become relatively complex in configuration for certain valve arrangements and as a result may be quite costly to manufacture and sometimes to assemble.

The present invention provides an improved valve plate assembly including a valve biasing arrangement which utilizes one or more leaf springs of the curved disc type in combination with a supporting bridge member having a plurality of guide fingers operative to guide movement of the disc valve member and to retain the valve and leaf spring in relative position. The use of this improved spring biasing member provides numerous advantages over prior coil spring type biasing arrangements. For example, because the leaf spring of the present invention provides a variable spring rate, the required preloading on the valve member when in a closed position may be reduced thereby reducing residual stress on the valve member. Similarly, the spring rate of the leaf spring may be lower for the initial opening of the valve member. Further, it is possible to easily control or vary the preloading and spring rate for different compressors by merely increasing the number of leaf springs incorporated in the valve assemblies. Additionally, when multiple leaf springs are employed, the frictional forces acting between the leaves provides a damping action which is particularly desirable to eliminate vibration of the valve member at high frequency operation as well as providing a redundancy so as to assure continued operation even in the event one of the leaf springs should fail.

Additional advantages and features of the present invention will become apparent from the subsequent description and the appended claims taken in conjunction with the accompanying drawings.

BRIEF DESCRIPTION OF THE DRAWINGS

FIG. 1 is a fragmentary section view of a portion of a refrigeration compressor showing a valve plate assembly in accordance with the present invention;

FIG. 2 is a fragmentary plan view of the valve plate assembly of FIG. 1;

FIGS. 3 and 4 are section views of the valve plate assembly of FIG. 1, the sections being taken along lines 3—3 and 4—4 respectively thereof;

DESCRIPTION OF THE PREFERRED EMBODIMENT

Figure 5:
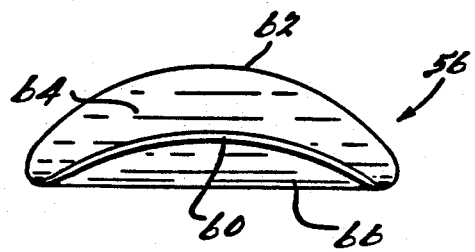
FIG. 5 is a perspective view of a leaf spring member designed for use in the valve plate assembly of the present invention.

Referring now to the drawings and in particular to FIG. 1 thereof, there is shown a valve plate assembly 10 in accordance with the present invention and comprising a valve plate 12 having a ring valve seat member 14 positioned within a generally conically shaped opening provided therein so as to define substantially concentric suction and discharge gas passages 16 and 18 respectively therethrough. A second plate member 30 is positioned on the upper surface of valve plate 12 with a suitable sealing gasket 22 disposed therebetween so as to isolate suction and discharge gas passages 16 and 18. An opening 24 is provided extending through plate 20 which is adapted to allow discharge gas to pass upwardly (as shown) therethrough. The valve plate assembly as described thus far is substantially identical to the valve plate assembly described in detail in assignee's copending application Ser. No. 114,346.

A lightweight compliant polymeric discharge valve member 26 is also provided seated against conical surface 28 which defines a valve seat within discharge passage 18. Discharge valve 26 is preferably of the general type described in detail in assignee's copending application Ser. No. 971,309.

A bridge member 30 is provided having a generally cylindrically shaped central portion 32 positioned approximately coaxially with opening 24 and a pair of diametrically outwardly extending arms 34 and 36 are secured to the upper surface 38 of plate member 20 by means of bolts 40 and 42 extending through openings provided in arms 34 and 36 and into threaded engagement with suitably positioned openings provided in plate member 20. Central portion 32 of bridge member is of a diameter substantially less than the diameter of opening 24 provided in plate member 20 as to leave a substantially unrestricted area for passage of discharge gas and also includes a plurality of substantially identical circumferentially spaced depending guide fingers 44 projecting through opening 24 and into discharge passage 18 in valve plate 12. The lower surface 46 of each of guide fingers 44 is beveled or inclined so as to enable it to be positioned in very close, slightly spaced relationship to valve seat surface 28 of ring member 14. The inwardly facing surface 48 of each of guide fingers 44 has a concave shape defining segments of a cylinder having a diameter slightly greater than that of valve member 26 so as to provide a clearance therebetween.

A wear plate member 50 is also provided positioned in engaging relationship with under surface 52 of bridge member 30. Wear plate member 50 has a generally circular shape with a diameter approximately equal to the diameter of the central portion of bridge member and includes a plurality of flat edge surfaces 54 positioned adjacent each of the guide fingers 44 and cooperating therewith so as to prevent relative rotation of the wear plate.

Figure 7:
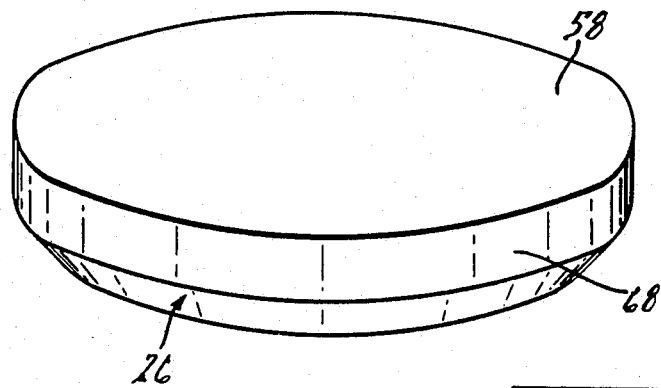
FIG. 7 is a perspective view of the discharge valve shown in FIG. 1.

In order to bias valve member into a closed position as shown a pair of substantially identical leaf springs 56 of the curved disc type are provided being positioned between upper surface 58 of valve member 26 and lower surface 59 of wear plate 50. As best seen with reference to FIG. 5, leaf springs 56 are each in the form of relatively thin metal discs having diametrically opposite edges 60 and 62 bowed upwardly as shown therein so as to define a generally arcuate shape in transverse cross section. As clearly shown in FIG. 4, leaf springs 56 do not have any openings provided therein and are positioned with concave surface 64 facing lower surface 59 of wear plate 50, the convex surface 66 forming a pivotal engagement with surface 58 of valve member 26 which is also preferably flat or planar over the entire extent thereof (FIGS. 1 and 4, or FIG. 7). This orientation prevents excessive wear on the valve member as well as possible wear of the guide fingers during compression of the leaf spring which could result from movement of edges 60 and 62 during compression of leaf springs 56. Also, leaf springs 56 will preferably have a maximum diameter when in a flattened fully compressed condition slightly less than the diameter of wear plate 50 and the inner surfaces 48 of guide fingers 44 will operate to prevent leaf spring 56 from slipping over the edge thereof. It is also important that the maximum diameter of leaf spring 56 be selected to provide a slight minimal clearance with guide fingers 44 when properly centered so as to avoid the possibility of leaf springs 56 becoming locked in a fully compressed condition. It should also be noted that the use of such a continuous planar or flat upper surface 58 on discharge valve 26 eliminates any potential points of stress concentration which could possibly contribute to valve failure.

Figure 6:
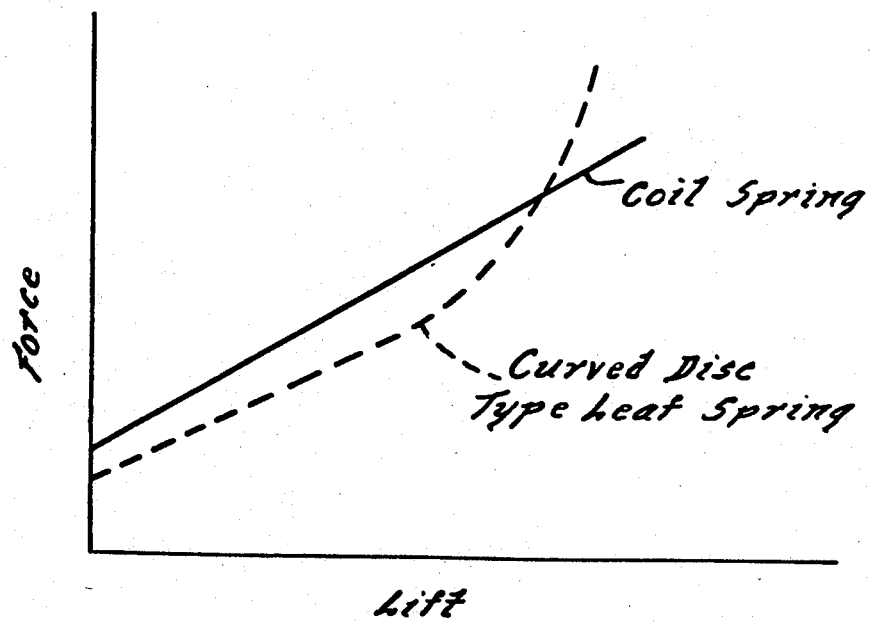
FIG. 6 is a graph plotting the relationship between biasing force and lift for both the leaf spring forming a part of the present invention and a conventional coil spring.

In operation, as the suction gas is compressed by operation of the compressor the increasing pressure acting on the lower surface of valve member 26 will cause it to move upwardly (as shown) thereby opening the compression chamber to the discharge passage 18 and compressing leaf spring 56. The inner surfaces 48 of guide fingers 44 will cooperate with the cylindrical sidewall 68 of valve member 26 to restrict or inhibit lateral movement thereof thereby maintaining proper alignment of valve member 26. Compressive movement of leaf spring 56 into substantially full surface contact with surface 59 of wear plate 50 will operate to provide a positive stop thereby limiting the maximum opening of valve member 26. However, because as shown in FIG. 6 the spring rate increases with increasing lift, the velocity at which the valve member moves into this maximum open position may be less than with a comparable fixed rate coil spring. Further, because of the variable spring rate offered by such leaf springs, it is possible to reduce the preloading on the valve member as shown on the graph of FIG. 6 below that generally required for a comparable coil spring valve assembly. This may be particularly desirable for polymeric valve members of the type disclosed in assignee's aforementioned '309 application. It should also be noted that it is possible to adjust both preloading and overall spring rate without altering the geometry or dimensions of the various components by merely inserting additional leaf springs 56. Additionally, when multiple leaf springs are employed such as is shown, there will be a slight relative movement between the engaged surfaces thereof during compression and relaxation. The frictional forces resulting from this movement will provide a damping action which is particularly desirable at high frequency operation to inhibit vibration of valve member 26. Also, the use of multiple leaf springs provides redundant biasing means thereby improving operating reliability. It also appears that the use of leaf springs offers the advantage of quieter operation as compared with the use of coil springs.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. An improved valve assembly for use in compressors, comprising:
   a valve plate adapted for controlling fluid from a compression chamber of said compressor and having a circularly shaped discharge opening therethrough,
   the sidewalls of said opening defining a valve seat having an increasing diameter in a direction away from said compression chamber;
   a disc-shaped valve member positioned within said opening for movement to and from a closed position in which it is in sealing engagement with said valve seat,
   said valve member being formed of a compliant polymeric material;
   a bowed leaf spring formed of metal and positioned in alignment with said valve member,
   the convex center portion of said leaf spring acting against said valve member and biasing it into a closed position; and
   a bridge member overlying said discharge opening and fixed in position with respect to said valve plate,
   said bridge member having means defining guide surfaces extending into said opening and surrounding the peripheral edge of said valve member and said leaf spring so as to maintain said leaf spring and valve member generally in alignment with one another and said discharge opening, said guide surfaces being normally radially spaced from the peripheral edge of said leaf spring when said valve member is in a closed position, and said means defining said guide surfaces being spaced from the sidewalls of said opening so as to define a discharge passage therebetween.

2. An improved valve assembly for use in compressors, comprising:
   a valve plate adapted for controlling fluid flow from a compression chamber of said compressor and having a circularly shaped discharge opening therethrough;
   the sidewalls of said opening defining a valve seat having an increasing diameter in a direction away from said compression chamber;
   a disc-shaped valve member positioned within said opening for movement to and from a closed position in which it is in sealing engagement with said valve seat, said valve member being formed of a compliant material and having a substantially flat surface opposite said compression chamber;

a bowed leaf spring formed of metal and positioned in alignment with said valve member, the convex center portion of said leaf spring being wholly imperforate and normally acting against said flat surface on said valve member generally along a substantially straight line and biasing it into a closed position; and a bridge member overlying said discharge opening and fixed in position with respect to said valve plate;

said bridge member having means defining a plurality of spaced guide surfaces extending into said opening and surrounding the peripheral edge of said valve member and said leaf spring so as to maintain said leaf spring and valve member generally in alignment with one another and said discharge opening, said guide surfaces being normally radially spaced from the peripheral edge of said leaf spring when said valve member is in a closed position a sufficient distance to accommodate radial movement of said leaf spring and said means defining said guide surfaces being axially and radially spaced from the sidewalls of said opening so as to define a discharge gas flowpath therebetween.

3. An improved valve assembly for use in compressors, comprising:

a valve plate adapted for controlling fluid flow from a compression chamber of said compressor and having a circularly shaped discharge opening therethrough, the sidewalls of said opening defining a valve seat having an increasing diameter in a direction away from said compression chamber;

a disc-shaped valve member positioned within said opening for movement to and from a closed position in which it is in sealing engagement with said valve seat, said valve member being formed of a compliant material and having a substantially flat surface opposite said compression chamber;

a bowed leaf spring formed of metal and positioned in alignment with said valve member, the convex center portion of said leaf spring being wholly imperforate and normally acting against said flat surface on said valve member generally along a substantially straight line and biasing it into a closed position; and a bridge member mounted in a fixed position with respect to said valve plate, said bridge member including a stop surface formed of a relatively hard material engaging the outer periphery of said bowed leaf uspring to urge said valve member into said closed position, said guide surfaces being normally radially spaced from the peripheral edge of said leaf spring a sufficient distance so as to accommodate radial movement of said leaf spring and said means defining said guide surfaces being spaced from the sidewalls of said opening whereby a discharge gas flowpath is provided therebetween.

4. An improved valve assembly as claimed in claim 3, wherein said valve member and leaf spring cooperate with one another so that no peripheral edge of said leaf spring is ever in a position to cause damaging wear on said flat surface of said valve element.

* * * * *